Figure 1:
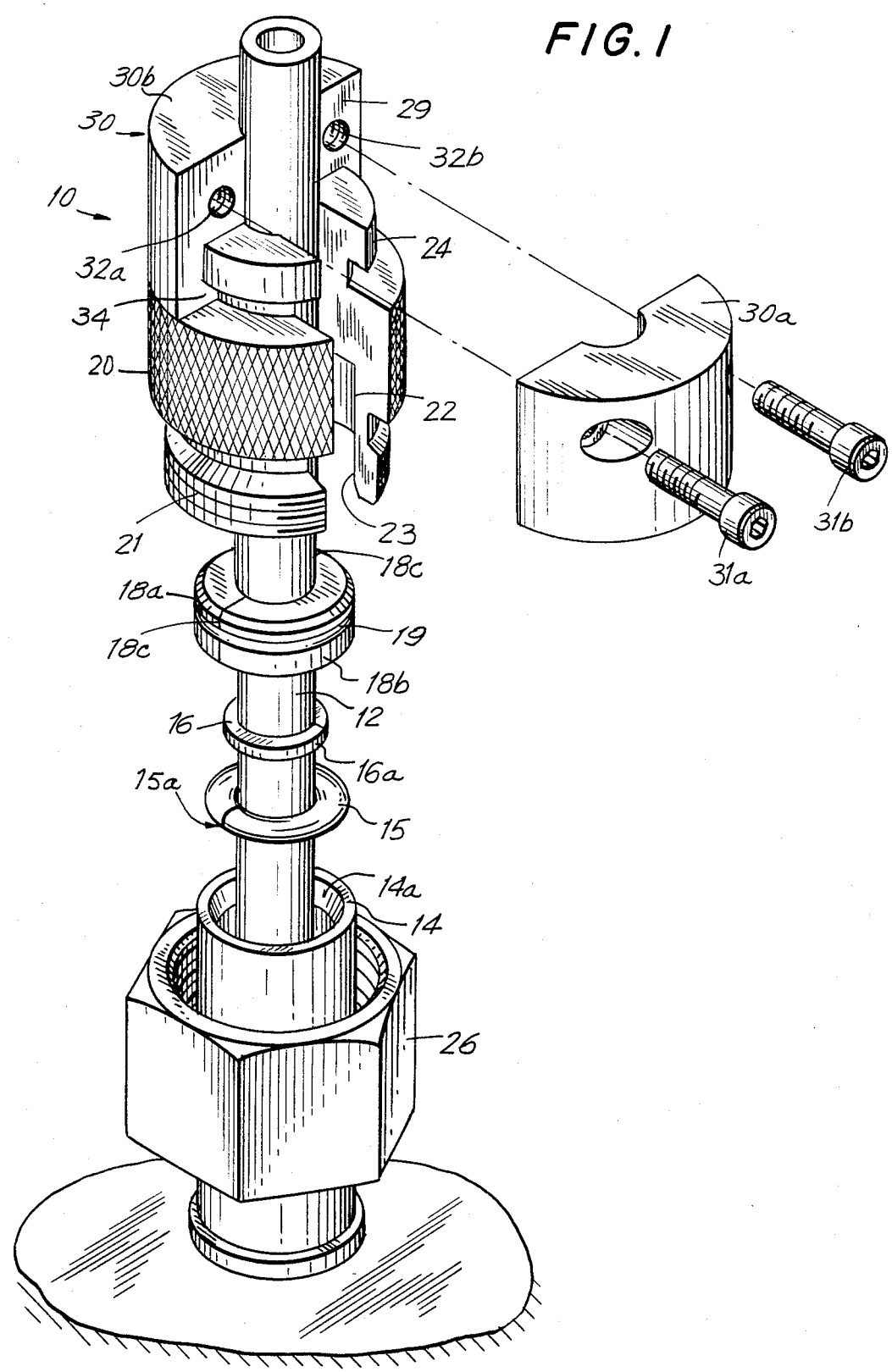

United States Patent [19]

Rabe et al.

[11] Patent Number: 4,580,788
[45] Date of Patent: Apr. 8, 1986

[54] SPLIT RING SEALING DEVICE FOR HIGH PRESSURE SERVICE

[75] Inventors: George B. Rabe, Sparta; Robert H. Johnson, Budd Lake, both of N.J.

[73] Assignee: Foster Wheeler Energy Corporation, Livingston, N.J.

[21] Appl. No.: 643,579

[22] Filed: Aug. 23, 1984

[51] Int. Cl.⁴ .......................... F16J 15/12; F16L 19/00
[52] U.S. Cl. ........................ 277/12; 277/110; 277/188 A; 277/216; 277/1; 285/343; 285/349; 285/353; 285/389
[58] Field of Search ................ 277/12, 32, 110, 111, 277/112, 188 R, 188 A, 216, 1; 285/337, 343, 349, 351, 353, 354, 386, 389

[56] References Cited

U.S. PATENT DOCUMENTS

| | | | |
|---|---|---|---|
| 416,058 | 11/1889 | Grob | 277/110 |
| 1,321,929 | 11/1919 | Loetzer et al. | 285/349 X |
| 2,022,529 | 11/1935 | Townsend | 285/349 X |
| 3,563,576 | 2/1971 | Lee | 285/353 |
| 3,615,109 | 10/1971 | Brinda et al. | 285/354 X |
| 4,169,967 | 10/1979 | Bachle | 285/343 X |
| 4,284,298 | 8/1981 | Kaufmann | 285/351 X |

FOREIGN PATENT DOCUMENTS

| | | | |
|---|---|---|---|
| 699826 | 12/1964 | Canada | 285/354 |
| 96164 | 5/1972 | France | 285/354 |
| 2083150 | 3/1982 | United Kingdom | 285/343 |

Primary Examiner—Robert S. Ward
Attorney, Agent, or Firm—Marvin A. Naigur; John E. Wilson; Martin Smolowitz

[57] ABSTRACT

A split type sealing device for providing high pressure sealing around a cylindrical member such as a tube. The sealing device utilizes a primary flexible split seal ring element and a rigid split back-up ring, which have their splits positioned on opposite sides of the cylindrical member so as to encircle the member. The seal rings are maintained in position against high sealing pressure by a split seal retainer enclosed by mating clamping means, such as a slotted coupling member having an external threaded end and a mating conduit and ring nut. The pressure axial loading on the tube is accommodated by a split clamp ring which clamps the coupling to the cylindrical member, which is usually a tube. The seal device is suitable for sealing against internal pressures of 0-5000 psi.

11 Claims, 4 Drawing Figures

SPLIT RING SEALING DEVICE FOR HIGH PRESSURE SERVICE

BACKGROUND OF INVENTION

This invention pertains to a split ring sealing device, and pertains particularly to such a sealing device for providing a high pressure seal around cylindrical elements.

Split ring sealing devices for sealing around cylindrical elements such as rods or tubes are generally known, and are used in applications where a continuous seal cannot be applied for reasons of inaccessibility on an end of the seal member. For example, U.S. Pat. No. 2,022,529 to Townsend discloses a packing gland for pressure sealing around a thin wall tube by using two slotted metal collars enclosing a lead split seal deformable by axial clamping force. U.S. Pat. No. 2,431,154 to Wikstrom discloses a cable securing device which utilizes a split packing and seal ring held in position around the cable by a split threaded element. U.S. Pat. No. 3,013,825 to Wilson discloses a split rubber bushing compressed around a wire line by a split axially movable bushing to strip liquids from the moving line. U.S. Pat. No. 4,150,847 to De Cenzo discloses a tube coupling having a seal anchor ring formed by arcuate segments. Also, U.S. Pat. No. 4,258,944 to Wendel discloses a seal assembly utilizing a resilient split seal ring, but does not utilize a rigid back-up ring and is not suitable for withstanding high pressure service. Thus, these known prior art split ring sealing devices have various disadvantages, such as being difficult to assemble, unreliable and prone to leakage occurring around the sealed element. These problems and disadvantages have been advantageously overcome by use of the present invention.

SUMMARY OF INVENTION

The present invention provides a split ring type sealing device and method for pressure sealing around a cylindrical member such as a rod or tube. The split seal device is designed to be utilized in applications where a continuous seal element cannot be applied due to the sealed member, e.g. a tube, being inaccessible from an end of the member for the installation of the continuous seal element around the member.

More specifically, the split ring seal device of the present invention comprises a deformable torus-shaped primary seal element such as an O-ring having a single radial cut, with the seal element being placed around a cylindrical member such as a tube, a back-up seal ring element also positioned around the cylindrical member, a split seal retainer having a recess for fitting over the back-up ring element, a conduit having an inner angled surface for mating with said primary seal element, a first coupling means having a slot with width suitable for positioning the coupling around the cylindrical member, a second clamping means adapted for mating with said first clamping means so as to clamp the seal rings to the conduit, and a split ring for clamping around the cylindrical member and the coupling to rigidly connect the coupling to the cylindrical member.

The primary O-ring seal is usually made of flexible elastomer material, such as Viton, Buna-N, and such, and the back-up ring is usually made of a more rigid elastomer material such as polytetrafluoroethylene, e.g. TEFLON. The cylindrical member is usually a tube. The first and second mating clamping means are preferably provided by a threaded coupling having an external threaded portion and a mating ring nut having an internal thread sized for screwing onto the threaded portion of the coupling.

In the method of the invention, a torus-shaped deformable primary seal element having a single radial cut is placed around the cylindrical number such as a tube and a relatively rigid back-up ring also having a single radial cut is positioned adjacent the primary seal with the radial cuts rotated 90°-180° away from each other. A rigid split seal retainer ring having an inner annular recess is provided enclosing the back-up ring, so that the split surfaces are located about 90° away from the cut in the back-up ring. The primary seal ring is then placed against an annular angled surface of a conduit member and a first clamping means having a radial slot is fitted over the cylindrical member and clamped to a mating second clamping means. The first clamping means is usually a coupling having an external threaded portion which is screwed onto an internally threaded ring nut second clamping means. The first clamping means is then clamped tightly onto the cylindrical element using a split clamping which is positioned around the first clamping means to withstand the axial forces caused by the high pressure.

It is an advantage of the present invention that the split primary seal device can be readily installed and removed from around a cylindrical rod or tube which does not provide access to an end, so as to provide a reliable seal. The sealing device is adapted to be suitable for high pressure service, such as for 0–5000 psi pressure.

Figure 2:
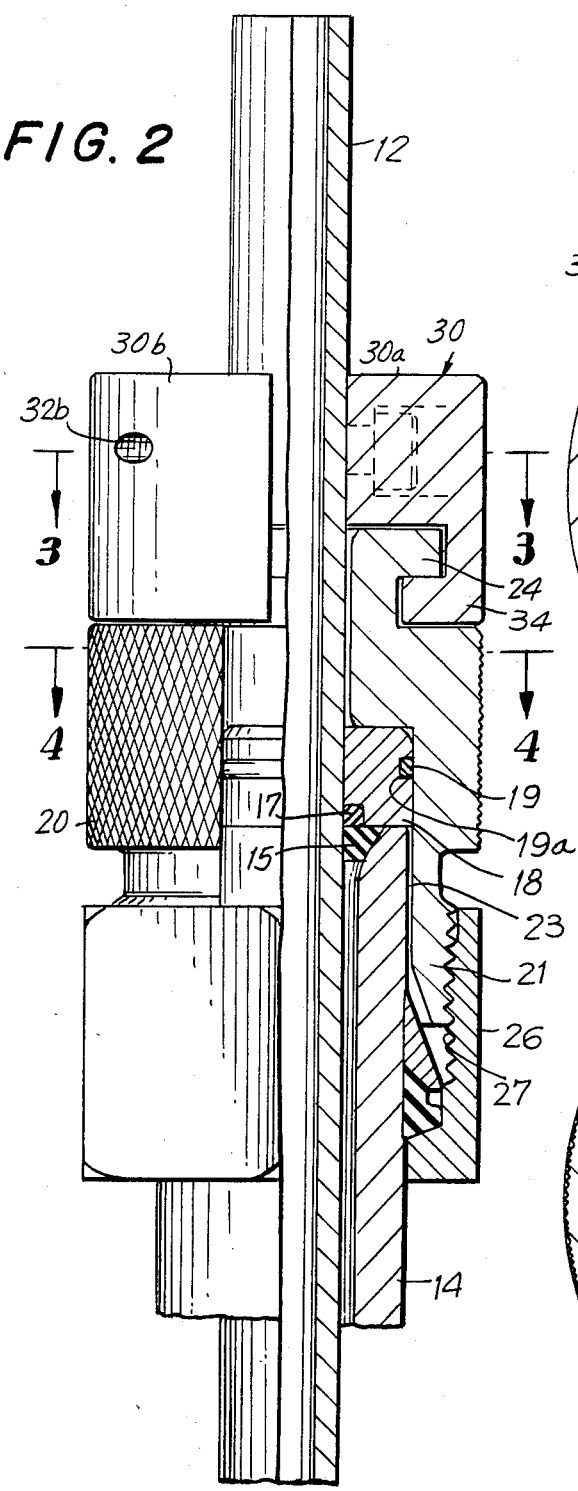
Figure 3:
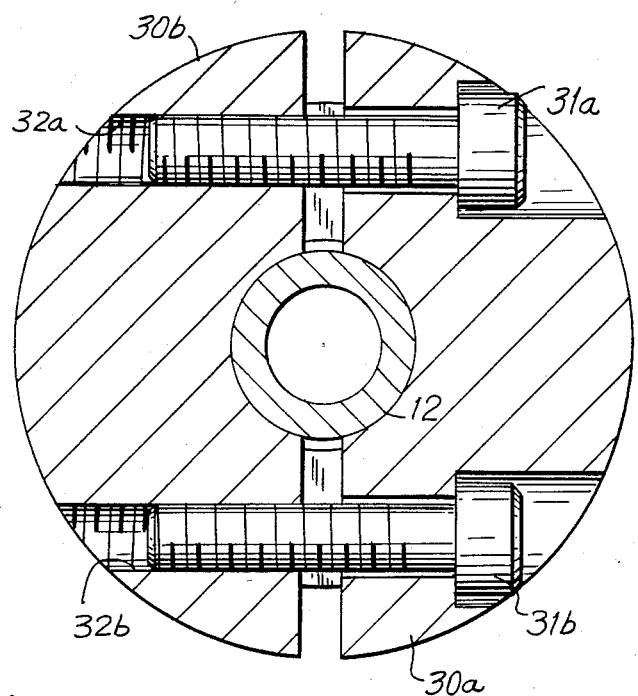
Figure 4:
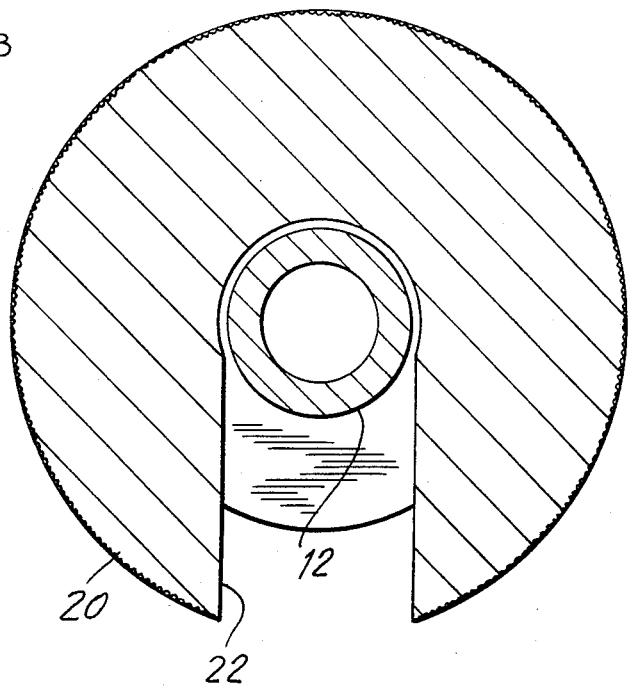

BRIEF DESCRIPTION OF DRAWINGS The invention will be described more fully with reference to the following drawings, in which: FIG. 1 is an exploded perspective view showing the various parts of the split ring device; FIG. 2 shows an assembled sectional view of the seal device assembly; FIG. 3 shows a sectional view taken along lines 3—3 of FIG. 2; and FIG. 4 shows a sectional view taken along lines 4—4 of FIG. 2.

DESCRIPTION OF INVENTION

Referring now to the FIG. 1 and FIG. 2 drawings, the split seal assembly 10 consists of various mating parts for providing a compact and pressure-tight seal between the outer surface of a cylindrical rod or tube element 12, which is inserted into a conduit 14. In making the sealing joint, a flexible split primary seal ring 15, which has a single cut 15a on a radial line, is first placed around the tube 12. This O-ring shaped primary sealing member 15 is made of a flexible elastomer material, such as Viton, Buna-N, or other similar material having good resistance against deformation and extrusion. To prevent high pressure extrusion of this primary sealing member 15 between the surface of tube 12 and the inside diameter of a split seal retainer 18, a relatively rigid segmented back-up ring 16 having a generally rectangular cross-sectional shape and having a single radial angled cut 16a is placed around the tube 12. The cut 16a is located at least about 120° and preferably about 180° away from cut 15a in the primary O-ring seal 15. The back-up ring 16 is usually made of a relatively rigid elastomer polytetrafluoroethylene (TEFLON) or some similar relatively rigid elastomer material.

The two seal ring members 15 and 16 are further supported by a rigid metal split seal retainer 18, which is split into two halves 18a and 18b and have a counterbore or recess 17 on one side. The split seal retainer 18 is placed around the tube 12, with the counterbore surface 17 oriented to face toward the back-up ring 16. The retainer ring 18 has the split joint surface 18c between halves 18a and 18b rotated so as to be located about 90° away from the cuts in the sealing ring 15 and back-up ring 16, i.e. from the cut 15a in ring 15 and cut 16a in back-up ring 16. The two halves 18a and 18b of seal retainer 18 is usually held together by a wire retaining ring 19 located in circular shaped groove 19a surrounding retainer ring 18.

For retaining the primary seal ring 15 firmly against inner annular chamfer surface 14a of conduit 14 and pressing rings 16 and 18 axially together, a coupling 20 and mating ring nut 26 are provided. The coupling 20 has an externally threaded portion 21 which mates with internal threads 27 of ring nut 26. Coupling 20 also contains a radial slot 22 sufficiently wide to be slipped over the tube 12. Upon assembly of coupling 20 over tube 12, the slot 22 is located about 90° away from the parting line 18c of seal retaining ring 18. The chamfered sealing surface 14a is at an angle of 20°–40° with the longitudinal axis of the conduit and seal assembly. The coupling 20 has a cylindrical-shaped recess 23, which fits snugly over the conduit 14, and the retainer ring 18 as is more clearly shown in their assembled positions in FIG. 2. The threaded portion 21 of slotted coupling 20 is screw threaded into ring nut 26. When coupling 20 is positioned with slot 22 being located about 90° away from the split in seal retainer 18, a tight seal around tube 12 is provided. Coupling 20 also has an annular outwardly projecting portion 24 for interfitting with a split retainer clamp, as is further explained below.

The coupling 20 restrains the axial pressure forces from thimble tube 12 by the addition of a split thimble clamp 30, which is split on its diameter at 29 to provide half portions 30a and 30b. The half portion 30a is held in position against clamp part 30b by two bolts 31a and 31b, which are screwed into threaded holes 32a and 32b. The thimble clamp 30 is also provided with an inwardly projecting shoulder 34 which is sized to interfit with outwardly projecting portion 24 of coupling 20. Thus, the thimble tube 12 is pinched tightly between the halves of clamp 28. The coupling 20, ring nut 26, and clamp 30 are made of a high strength material, such as stainless steel.

The split sealing device of this invention has been successfully pressure tested, repeatedly at 3600 psi pressure and was found to be tight.

Although the clamping function for sealing elements 15, 16 and 18 is preferably provided by coupling 20 and ring nut 26 shown as mating threaded members, they could alternatively be clamped by bolted flange clamp type coupling members, which would provide the same basic sealing function as the threaded coupling.

Although the present invention has been described broadly and in terms of a preferred embodiment, it will be understood that various modifications and variations can be made within the scope of the invention, which is defined by the following claims.

What is claimed is:

1. A split ring sealing device for high pressure sealing around a cylindrical member, said device comprising
   (a) a deformable primary torus-shaped seal element having a single radial cut, said element being placed around a cylindrical member;
   (b) a back-up seal ring element positioned around said cylindrical member and having a single radial cut located 90°–180° away from the radial cut in said primary seal element;
   (c) a split retainer ring having a recess sized for fitting over said back-up seal ring element;
   (d) a conduit having an inner annular surface for mating with said primary seal element;
   (e) a clamping means having a radial seat therein sized for positioning the clamping means around said cylindrical member;
   (f) a second clamping means adapted for mating with said first clamping means to clamp said primary seal element between said cylindrical member and the angled sealing surface of said conduit; and
   (g) split clamping means for clamping around said cylindrical member and the outer end of said first clamping means, for rigidly connecting the first clamping means to said cylindrical member.

2. A sealing device according to claim 1, wherein said primary seal element is an O-ring made of an elastomeric material.

3. A sealing device according to claim 1, wherein said back-up seal element is composed of polytetrafluoroethylene.

4. A sealing device according to claim 1, wherein said split seal retainer is retained together by a metal snap wire ring fitted around the retainer.

5. A sealing device according to claim 1, wherein said cylindrical member is a tube.

6. A sealing device according to claim 1, wherein the conduit chamfered sealing surface is at an angle of 20°–40° with the axis of the conduit.

7. A sealing device according to claim 1, wherein said first clamping means is provided by a coupling and said second clamping means is a mating ring nut.

8. A sealing device according to claim 7, wherein said coupling and mating ring nut are made of stainless steel.

9. A split ring sealing device for high pressure sealing service around a cylindrical member, said device comprising:
   (a) a deformable primary torus-shaped seal element having a single radial cut and being placed around a cylindrical member;
   (b) a back-up seal ring element positioned around said cylindrical member and having a single radial cut located at about 90°–180° away from the radial cut in said primary seal element;
   (c) a split retainer ring having a recess fitting over said back-up seal ring element;
   (d) a conduit having an inner annular surface for mating with said primary seal element;
   (e) a coupling having an external threaded portion and having a radial slot sized for positioning the coupling around said cylindrical member;
   (f) a ring nut having an internal thread sized for engaging onto the threaded portion of said coupling to clamp said primary seal element between said cylindrical member and the angled sealing surface of said conduit; and
   (g) a split ring for clamping around the cylindrical member and the outer end of said coupling, for rigidly connecting the coupling to said cylindrical member.

10. A method for providing pressure sealing around a cylindrical member using deformable ring element, comprising:
   (a) placing around a cylindrical member a deformable primary torus-shaped seal element having a single radial cut;

(b) positioning around said cylindrical member a relatively rigid back-up ring element having a single radial cut located 90°–180° away from the radial cut in said primary seal element;

(c) providing adjacent to said back-up ring, a rigid split seal retainer ring having an annular recess enclosing said back-up ring so that the split surfaces are located about 90° away from the single cut in the back-up ring;

(d) placing said primary seal ring against an annular angled surface of a conduit member;

(e) placing around said cylindrical member a first clamping means having a radial slot therein sized for fitting over the cylindrical member and clamping said rigid retainer ring tightly to said conduit member using first and second mating clamping means; and (f) clamping said first clamping means to the cylindrical member.

11. The sealing method of Claim 10, wherein said first clamping means is clamped to the cylindrical element by fitting a split clamping around both the first clamping means and the cylindrical member.

* * * * *